(12) United States Patent
Wu

(10) Patent No.: US 12,704,711 B2
(45) Date of Patent: Aug. 11, 2026

(54) AIR VEIL SYSTEM FOR SENSOR HOUSING

(71) Applicant: Orchard Robotics Inc., Ithaca, NY (US)

(72) Inventor: Charles Hugh Wu, Sterling, VA (US)

(73) Assignee: Orchard Robotics Inc., Ithaca, NY (US)

( * ) Notice: Subject to any disclaimer, the term of this patent is extended or adjusted under 35 U.S.C. 154(b) by 308 days.

(21) Appl. No.: 18/529,835

(22) Filed: Dec. 5, 2023

(65) Prior Publication Data

US 2024/0184102 A1 Jun. 6, 2024

Related U.S. Application Data

(60) Provisional application No. 63/430,333, filed on Dec. 5, 2022.

(51) Int. Cl.
*G02B 27/00* (2006.01)

(52) U.S. Cl.
CPC ................................ *G02B 27/0006* (2013.01)

(58) Field of Classification Search
CPC .................................................. G02B 27/0006
USPC .......................................................... 359/507
See application file for complete search history.

(56) References Cited

U.S. PATENT DOCUMENTS 4,914,905 A * 4/1990 Dubois .................... F02K 1/70
239/265.29
10,035,498 B2 7/2018 Richardson et al.
10,676,070 B2 6/2020 Giraud et al.
11,279,287 B2 3/2022 Boegel et al.
11,425,287 B2 8/2022 Smith
2016/0209645 A1 7/2016 Britton
2018/0265049 A1 9/2018 Schmidt et al.
2020/0238955 A1 7/2020 Walsøe et al.
2021/0215930 A1 7/2021 Subratie

FOREIGN PATENT DOCUMENTS

GB 1039955 A 8/1966

OTHER PUBLICATIONS

PCT International Search Report and Written Opinion, PCT Application No. PCT/US23/82538, Apr. 5, 2024, 21 pages.

* cited by examiner

*Primary Examiner* — Bumsuk Won
*Assistant Examiner* — Rahman Abdur
(74) *Attorney, Agent, or Firm* — Fenwick & West LLP

(57) ABSTRACT

An air veil system includes a housing containing a sensor, and a manifold mounted to the housing. The manifold defines an air outlet as a continuous loop surrounding the sensor. The air outlet is configured to receive a supply of pressurized air from an air source and generate an airflow that extends outward from the continuous loop in front of the housing, the airflow creating an air veil surrounding the sensor. The air veil extends outward from the continuous loop in front of the housing at an angle such that the air veil converges at a point in an axial direction of the manifold in front of the housing. The manifold includes a first surface and a second surface disposed at a predetermined gap relative the first surface. The air outlet as the continuous loop is defined by the predetermined gap.

16 Claims, 11 Drawing Sheets

500
535
530F
535
510
530A
540
535
542
530E
530B
535
530D
535
530C

AIR VEIL SYSTEM FOR SENSOR HOUSING

TECHNICAL FIELD

Embodiments of the invention generally relate to a sensor housing, and more particularly to an air veil system for protecting sensors in a housing from environmental contaminants.

BACKGROUND

Off-road vehicles (tractors, trailers, dozers, skidders, all-terrain vehicles, utility vehicles, agricultural vehicles, farming equipment, construction vehicles, etc.) may be utilized to perform a variety of tasks in a variety of applications. For example, an agricultural vehicle may be utilized to perform different farming actions in a field.

Examples of farming actions include spraying fluids such as pesticides, fungicides, herbicides, or thinners at crops, weeds, or other plants. These actions may be performed with some frequency over a period of time, such as weekly during a growing or harvest season. The field where farming actions are performed may be very large. For example, an apple orchard may be hundreds or thousands of acres, and the crops in the orchard may need to be sprayed each week. Such a spraying operation may be performed in parallel by a fleet of similar vehicles to complete the operation in a reasonable amount of time.

The vehicles may be mounted with farming equipment to perform the spraying operation (e.g., an array of nozzles actuated by actuators). The vehicle may be further mounted with systems and sensors to perform a variety of tasks and/or gather sensor data. For example, one or more of the farming actions may be fully or partially automated, and the components on the vehicle may enable the autonomous operations. Sensors mounted on the vehicle may include cameras, radars, light detection and ranging (LIDAR) sensors, and the like, to capture sensor data that may be utilized for different applications such as autonomous driving, farming action automation, crop yield prediction, targeted see and spray, and the like. Further, since the field where farming actions are performed may be very large, it may be desirable to perform the various operations (e.g., capture of sensor data, farming operations like spraying, and the like) at the same time as the vehicle traverses rows of plants in the field, instead of traversing the whole field multiple times to perform the each operation separately.

The fluid (e.g., mixture of chemicals) in the spraying operation may be engineered to be a sticky mist so that it can adhere to the target crop even in adverse environmental conditions like rain, snow, wind, etc., and produce the desired effect of the spraying operation (e.g., weed treatment, promote plant growth, and the like). However, the sticky mist may also linger in the air and have the undesirable side effect of adhering to other surfaces like the vehicle windshield and other external surfaces of the vehicle including external surfaces of the sensors (e.g., camera lens, signal source, light source) mounted to the vehicle. This may further attract and cause other environmental contaminants (e.g., dust, fine particles, mud, insects, or debris) to stick to the sticky coating adhered to the external surfaces and/or the windshield, thereby degrading visibility and/or operation of the sensor. That is, as the vehicle traverses each row of crops to capture sensor data using the one or more sensors mounted to the vehicle while, at the same time, performing the spraying operation to coat the crops with the spray, the vehicle and the sensors mounted on the vehicle typically also receive a large coating of the spray and cause other environmental contaminants to stick to the coating, thereby hindering visibility and hindering operation of the sensors and accurate capture of the sensor data.

SUMMARY

The following presents a simplified summary of the disclosed subject matter to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one or more embodiments, an air veil system includes a housing including a sensor, and a manifold mounted to the housing, the manifold defining an air outlet as a continuous loop surrounding the sensor. The air outlet is configured to receive a supply of pressurized air from an air source and generate an airflow that extends outward from the continuous loop in front of the housing, the airflow creating an air veil surrounding the sensor.

In one or more embodiments, a method for creating an air veil comprises receiving pressurized air at an air intake coupled to a housing including a sensor, and supplying the pressurized air to a manifold mounted to the housing, the manifold defining an air outlet as a continuous loop surrounding the sensor. The method further comprises generating an airflow that extends outward from the continuous loop in front of the housing, the airflow creating an air veil surrounding the sensor.

In one or more embodiments, a method for adjusting an air veil comprises accessing sensor data indicating a state of a vehicle on which a housing is mounted, the housing including a sensor, wherein a manifold is mounted to the housing, the manifold defining an air outlet as a continuous loop surrounding the sensor. The method further comprises generating an air veil of forced air that surrounds the sensor and that extends outward from the continuous loop in front of the housing, and operating an actuator based on the sensor data to adjust a position or an angle of a surface or a surface section of the manifold, wherein adjusting the position or the angle of the actuator changes one or more parameters of the air veil.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
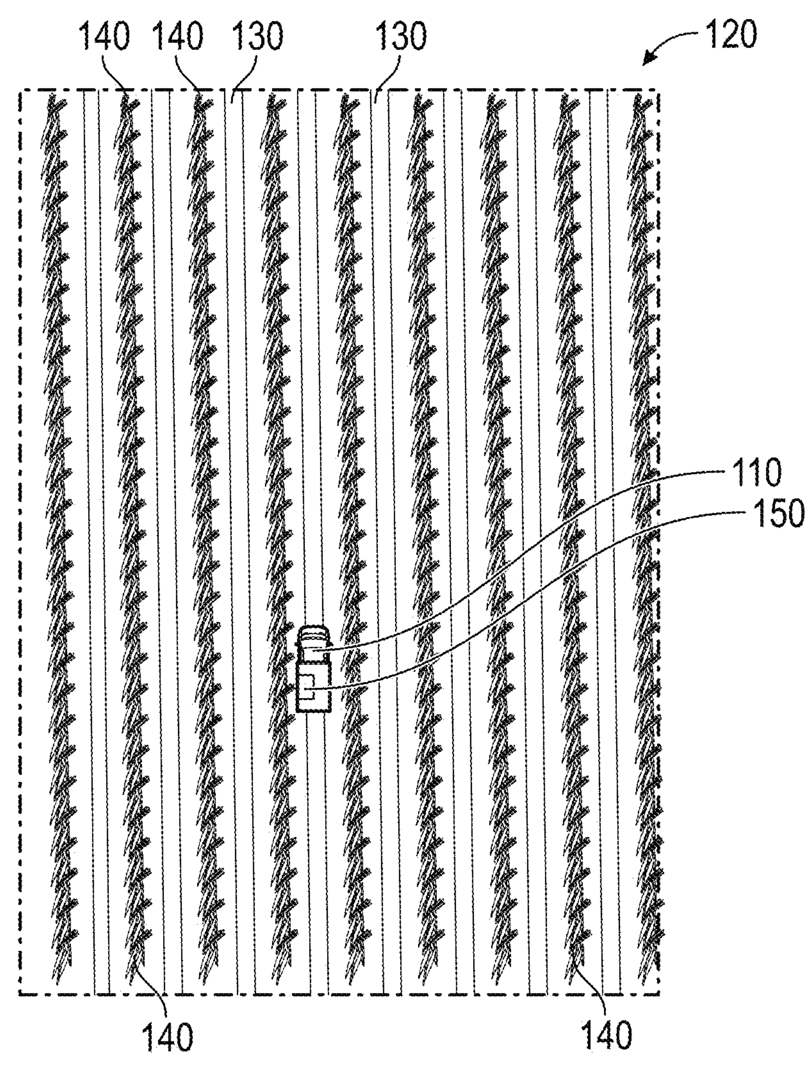
FIG. 1 is a schematic diagram of a vehicle performing a farming action in a field, in accordance with one or more embodiments.

While certain embodiments will be described in connection with the illustrative embodiments shown herein, the invention is not limited to those embodiments. On the contrary, all alternatives, modifications, and equivalents are included within the spirit and scope of the invention as defined by the claims. In the drawings, which are not to scale, the same reference numerals are used throughout the description and in the drawing figures for components and elements having the same structure.

DESCRIPTION

In the following description, for purposes of explanation, numerous specific details are set forth to provide a thorough understanding of the inventive concept. In the interest of clarity, not all features of an actual implementation are described. Moreover, the language used in this disclosure has been principally selected for readability and instructional purposes. Reference in this disclosure to "one embodiment" or to "an embodiment" or "another embodiment" means that a particular feature, structure, or characteristic described in connection with the embodiment is included in at least one embodiment of the invention, and multiple references to "one embodiment" or "an embodiment" or "another embodiment" should not be understood as necessarily all referring to the same embodiment.

The terms "a," "an," and "the" are not intended to refer to a singular entity unless explicitly so defined but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all the listed items unless explicitly so defined.

As used herein, the term "sensor" (or variants thereof) refers to any sensing hardware or equipment that is to be protected from environmental contaminants and isolated environmentally by creating an air veil as described herein. The sensing hardware may be a traditional sensor or a signal source, such as a camera, radar, light detection and ranging (LIDAR) sensor, light source, strobe light, ultrasonic sensor, color sensor, spectrometer, image sensor, ambient light sensor, signal source, and the like. The equipment that is to be protected by the air veil may be a physical windshield, a view port, a solar panel, and the like. The sensor may or may not be protected by additional coatings (e.g., water resistant coating) and may or may not be protected by external physical structures, such as a windshield, glass or other transparent plate, or other static, physical shields and barriers.

This disclosure pertains to an air veil system including a manifold that is continuous and forms a loop around a sensor to be protected and isolated from environmental contaminants (dust, fine particles, mud, insects, debris, spray, mist, fog, rain, snow, precipitation, etc.). The continuous loop acts as an air outlet from which a continuous airflow (e.g., pressurized air) is output without breaks or discontinuities in the airflow, thereby creating an enclosed air veil (e.g., air curtain, enclosed volume of air, air beam) that extends in front of the manifold and that surrounds the sensor without any gaps in the air veil. By causing pressurized air to flow as the air veil surrounding the sensor, the air veil system prevents contaminants in the ambient environment from penetrating the air veil and adhering to an external surface of the sensor, thereby preventing degradation in sensor operation or collection of sensor data. That is, the sensor is isolated from external environment using the pressurized airflow pushed through the manifold.

The air veil system may include one or more manifolds. In one or more embodiments, the manifold can be static, directing pressurized airflow to create the air veil having a constant angle, speed, volume, shape, and the like. In one or more embodiments, the manifold may be adjustable (e.g., using actuators) to change dynamics of the airflow (e.g., change vortices, airflow rate, speed, pressure, direction). The adjustment may be performed manually by an operator (e.g., by locking/unlocking a movable hinge on the manifold, by user input that instructs actuation of the actuators). As another example, the manifold adjustment may be performed automatically by implementing a control system running on a computer of the air veil system. The control system may be implemented as an algorithm (e.g., rule-based logic) using computer hardware/software, and/or using machine learning techniques to control the operation of the manifold based on data received from a variety of sources (e.g., data from sensors on-board the vehicle as well as other data (e.g., weather, precipitation, or wind) that may be received by the control system from a central server). For example, the control system may be configured to adjust parameters (e.g., angle, position, or orientation) of one or more surfaces or surface sections of the manifold based on the sensor data (e.g., data associated with wind speed, wind direction, airflow rate, vehicle direction, vehicle speed, temperature, humidity, vehicle operation state, and the like) to change the dynamics of the airflow and produce one or more air veils having desired characteristics or parameters (e.g., flow rate, pressure rate, shape, size, flow direction, point of convergence, convergence angle, divergence angle, air volume). The system may include more than one manifold, and each manifold may be independently maneuverable by the control system (and/or manually) giving the air veil system many degrees of freedom to exert precise control over the dynamics of the output airflow.

Each manifold may include a pair of surfaces, and each surface may be composed of various materials. Each surface of the manifold may be a continuous loop of material that may be angled forward and in/outwards to force high-pressure airflow to create a totally enclosed volume in front of the sensor. In one or more embodiments, each surface of the manifold may include a plurality of surface sections. The surface sections may be connected to each other in an airtight manner through various forms of bonding, including bonding with elastic, semi-flexible, or rubber-like materials to ensure individual maneuverability of each surface section using a corresponding actuator. Each surface or surface section may be independently and respectively maneuverable by a corresponding actuator (e.g., servo motor, linear actuator, lever arm mechanism, and the like) that actuates the surface or surface section to a specific position, angle, or orientation to adjust the airflow of the manifold and control resulting aerodynamic effects of the expelled air, as well as the parameters of the created air veil like its shape, volume, angle, flow rate, pressure rate, and the like.

By operating an air source (e.g., source of pressurized air, compressor, fan, and the like) that is connected to the manifold, the air veil may be created as a fully enclosed volume of air that can shield/protect the sensor enclosed in the volume/bubble of air. The pressurized airflow of the air veil may prevent outside particulates or contaminants or conditions (e.g., spray, dust, mist, smoke, rain, insects, mud, humidity, temperature) from affecting the operation of the sensor by isolating the sensor environmentally from its surroundings with the fast-moving stream of continuous, high-pressure airflow. Since the air veil may be made of ambient, transparent air (e.g., filtered air), operation of the sensor is not impacted by the virtual barrier created by the air veil.

Further, the air veil system may work effectively even in environments where mist/spray is densely present in the surrounding air, since the continuous loop of the manifold ensures that the (external surface of the) sensor is fully isolated from the surrounding outside environment and there are no gaps for any contaminants that may pass through the air veil and contact the sensor.

Still further, contrary to conventional systems that implement a "two-dimensional" curtain of air to shield equipment, the air veil system according to the present disclosure generates a "three-dimensional" volume (e.g., cone-shaped volume). As a result, an advantageous effect is produced whereby sensors that need to be protected from outside contaminants may be placed anywhere within the volume, including in front of the plane of the manifold, thereby resulting in an increased and unobstructed field of view for the sensor. In the conventional system, the airflow output vent must be placed in front of the plane of the sensor, thereby limiting the field of view of the sensor.

FIG. 1 is a schematic diagram of a vehicle 110 performing a farming action in a field 120, in accordance with one or more embodiments. Vehicle 110 may refer to an off-road vehicle or to a mobile platform coupled to an off-road vehicle. For example, vehicle 110 may be a mobile dolly or carriage that is coupled to a vehicle to navigate in an offroad environment. As another example, vehicle 110 may be a manually operated or a semi-autonomous or a fully-autonomously operated vehicle. Vehicle traverses rows 130 of crops 140 in the field 120 while continuously performing, e.g., a spraying operation. One or more sensors may be mounted to the vehicle 110 and operated at the same time as when the vehicle 110 may be performing the spraying operation while the vehicle 110 is navigating the rows 130 of crops 140 in the field 120. The spray mist from the spraying operation may adhere to all surfaces in its surrounding environment, including external surfaces of the vehicle 110 and external surfaces of the sensors mounted to the vehicle 110. In addition, environmental elements such as rain, dust, snow, fog, and the like may also contact the external surfaces of the sensors. To protect and isolate the one or more sensors mounted to the vehicle 110 from the environmental contaminants and elements, the vehicle 110 may be mounted with an air veil system 150 that includes a manifold that surrounds the one or more sensors and that provides complete, fully enclosed protection to the sensors. The air veil system 150 may be operable to constantly protect the sensors from outside contaminants which may be present in the exterior air or environment.

Figure 2:
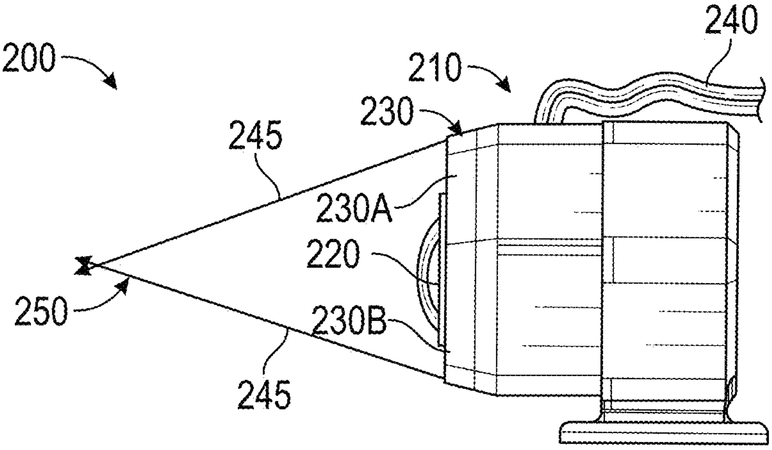
FIG. 2 is a schematic diagram showing a side view of an air veil system including a static manifold mounted to a housing containing one or more sensors, in accordance with one or more embodiments.

FIG. 2 is a schematic diagram showing a side view of an air veil system 200 including a static manifold 230 mounted to a housing 210 containing one or more sensors 220, in accordance with one or more embodiments. The air veil system 200 may be mounted to a vehicle (e.g., vehicle 110 of FIG. 1). The air veil system 200 includes a housing 210 that contains a sensor 220 (e.g., a camera). The housing 210 may be an enclosure which may contain one or more sensors that may benefit from protection of the air veil system 200. A manifold 230 is mounted to the housing 210. The manifold 230 defines an air outlet as a continuous loop along a periphery of the sensor 220 and surrounds the sensor 220. The manifold 230 is configured to receive a supply of pressurized air from an air source (not shown in FIG. 2) via an air intake 240. The manifold 230 may generate an airflow 245 that extends outward from the continuous loop in front of the housing 210. The airflow 245 creates an air veil 250 surrounding the sensor. The continuous veil of air 250 is created by forcing pressurized air from an air source via the air intake 240 and out through the manifold 230. In one or more embodiments, the sensor 220 may be a plurality of sensors all of which are protected by the same air veil 250. The sensor 220 may be a sensor that is mounted to the vehicle to enable operation of the vehicle (e.g., LiDAR sensor), or it may be an auxiliary sensor mounted to enable other operations like the spraying operation described above.

The manifold 230 may be designed to control the direction, intensity, and aerodynamic features of the airflow 245. Since the air veil 250 is a fully enclosed volume of air and not a singular curtain or a two-dimensional plane of air, equipment within the volume including the sensor 220 is protected by the air veil 250. The air veil 250 may produce the desired sensor protection and isolation effects regardless of orientation of the system 200 since the effects of gravity are negligible on the construction of the continuous air veil

250 due to the pressure of the airflow 245 exiting the manifold 230 being higher than a threshold pressure. Further, as will be evident from later figures, the continuous, looping nature of the manifold 230 ensures that the resulting air veil 250 stays as one fully enclosed, completely enveloping volume of air that isolates the sensor 220 from external contaminants. The manifold 230 shown in FIG. 2 may be static. That is, the manifold 230 may direct the pressurized airflow 245 to create the air veil 250 having a constant angle, speed, volume, and shape.

Figures 3, 4:
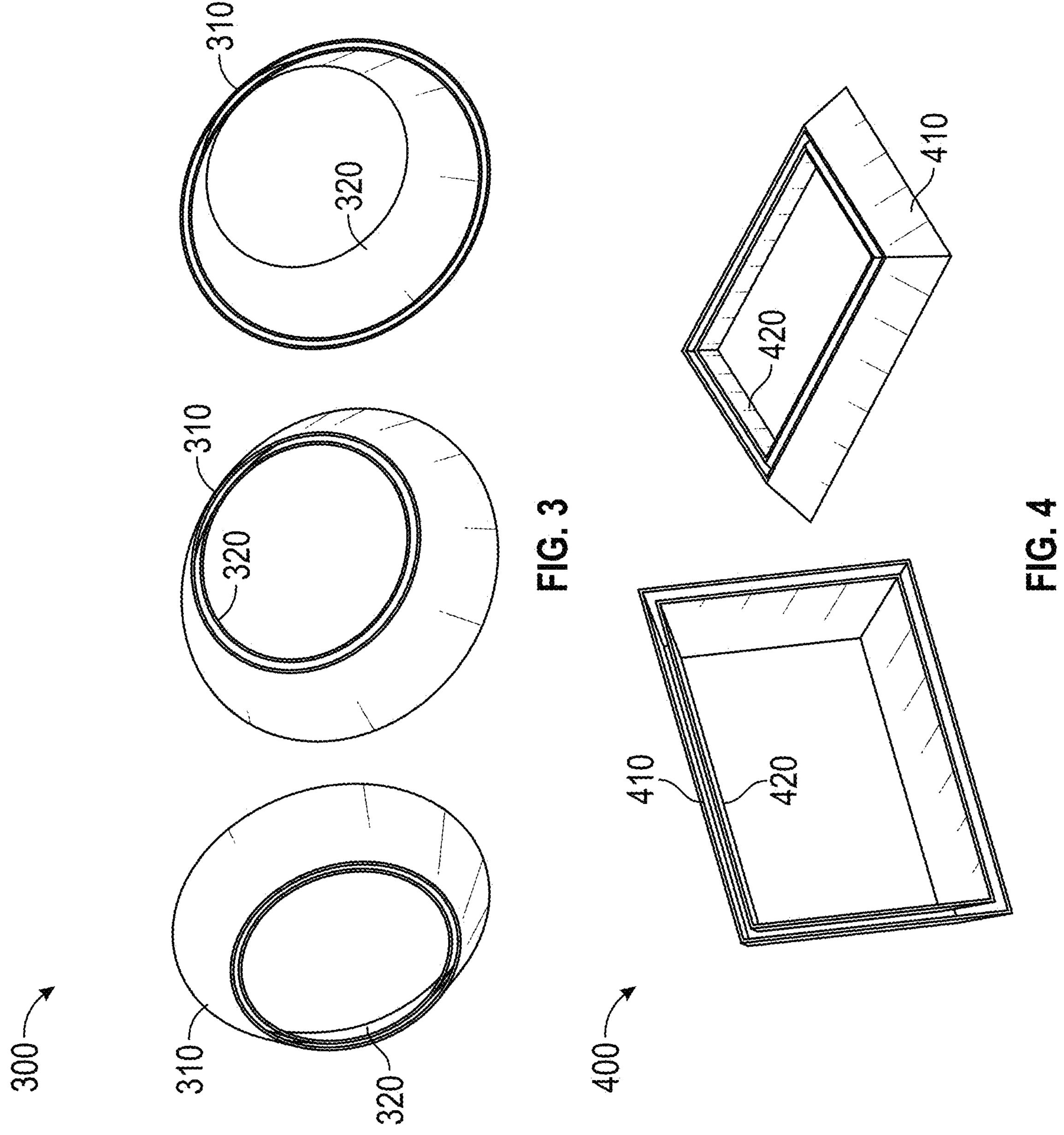
FIG. 3 is a schematic diagram showing perspective views of a static circular manifold, in accordance with one or more embodiments.
FIG. 4 is a schematic diagram showing perspective views of a static rectangular manifold, in accordance with one or more embodiments.

FIG. 3 is a schematic diagram showing perspective views of a static manifold 300 having a circular shape, in accordance with one or more embodiments. Other elements of the air veil system are not shown in FIG. 3 for ease of explanation. As shown in FIG. 3, the static circular manifold includes a first surface 310 and a second surface 320 and is configured to direct the airflow inwards (e.g., converging angle or direction). The first surface 310 and the second surface 320 define a predetermined gap which acts as an air outlet having a continuous loop.

Air flows between the two surfaces 310, 320 from the larger end to the smaller end, thereby forming a conical air veil in front of the smaller end. This air veil is continuous as there are no breaks/disjunctions in between the two surfaces 310, 320 (e.g., the volume between the two concentric surfaces 310, 320 is completely open).

FIG. 4 is a schematic diagram showing perspective views of a static manifold 400 having a rectangular shape, in accordance with one or more embodiments. As shown in FIG. 4, the static rectangular manifold 400 includes a first rectangular surface 410 and a second rectangular surface 420 and is configured to create a continuous loop of airflow and direct the airflow inwards (e.g., converging angle or direction). In the case of FIG. 4, the air veil that is created by the pressurized airflow will be a rectangular prism. Despite being a rectangle, and having four sharp vertices on each surface 410, 420, the area between the two surfaces 410, 420 is still free of gaps and breaks, allowing the resulting veil of air to be continuous. The static manifold 400 of FIG. 4 illustrates how differently constructed manifolds, regardless of shape/form, can produce a continuous veil of air that converges inward. Rectangular manifold 400 may be particularly useful for protection of a stereo camera sensor.

Figures 5, 6:
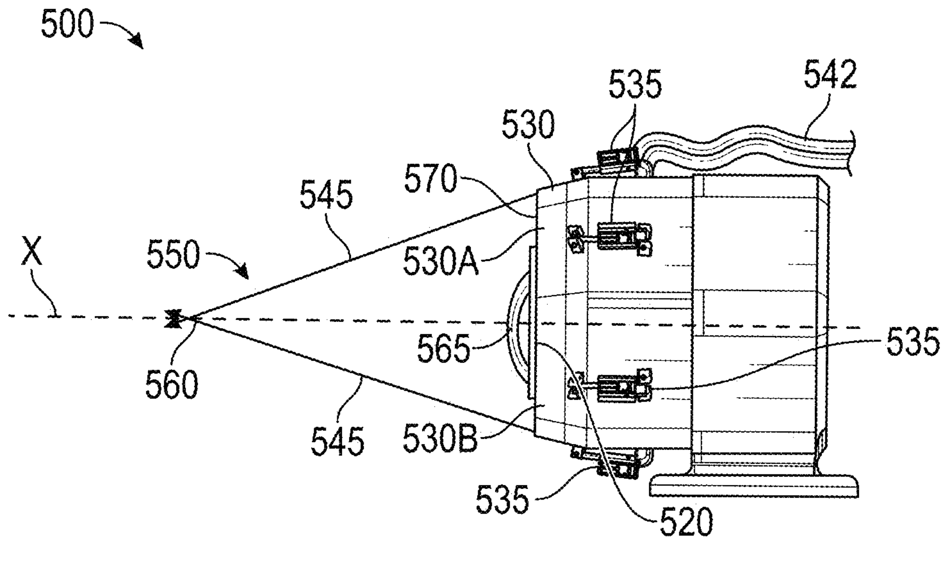
FIG. 5 is a schematic diagram showing a side view of an air veil system including an adjustable manifold mounted to a housing containing one or more sensors, in accordance with one or more embodiments.
FIG. 6 is a schematic diagram showing a perspective view of a housing on which an adjustable manifold is mounted, in accordance with one or more embodiments.
Figure 7:
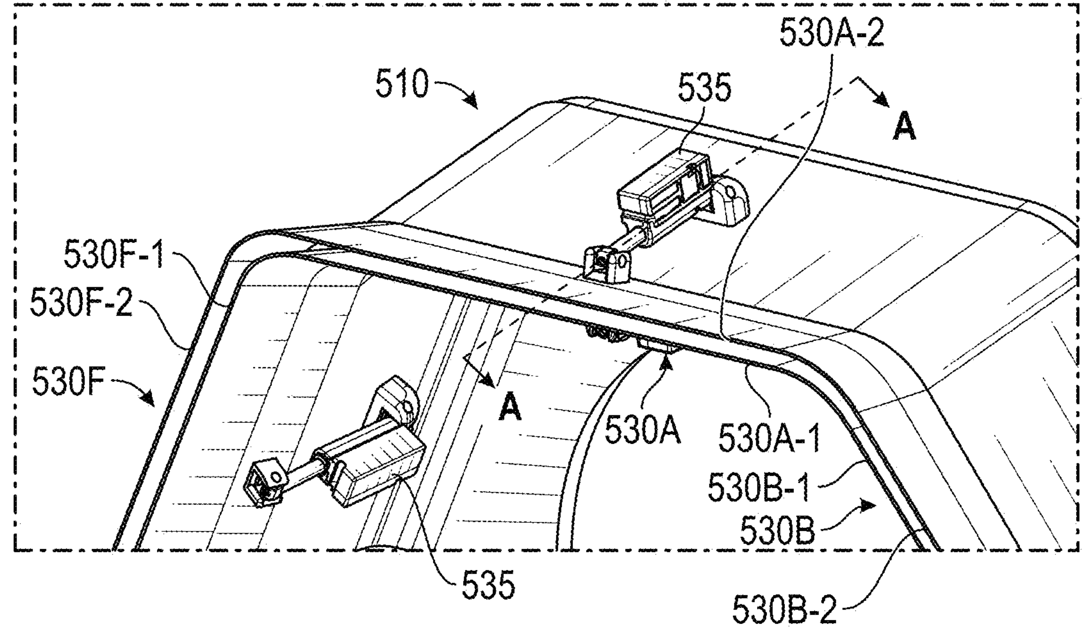
FIG. 7 is a schematic diagram showing a closeup view of the housing of FIG. 6, in accordance with one or more embodiments.
Figure 8A:
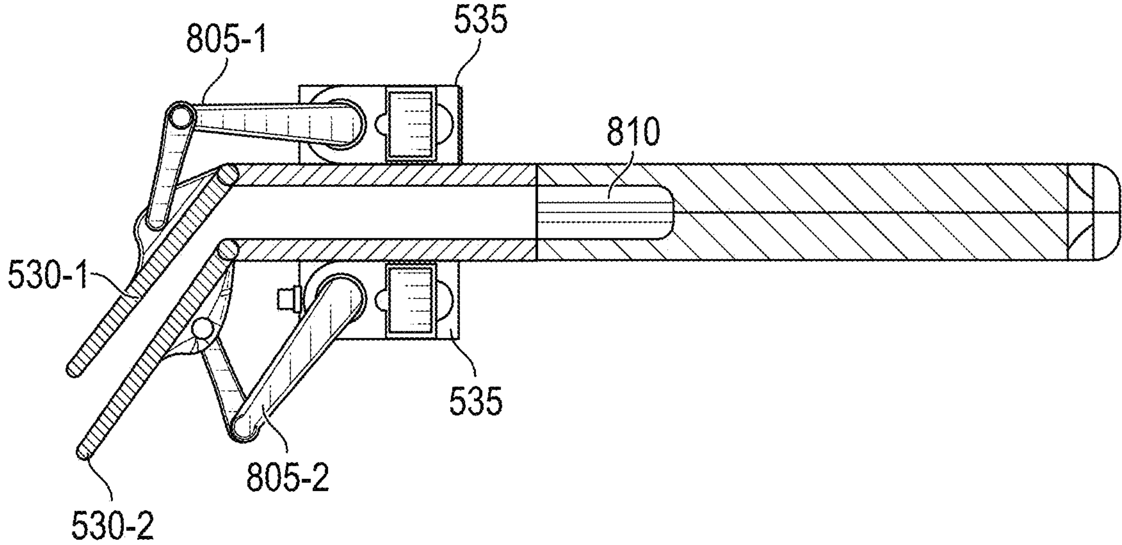
FIG. 8A is a schematic diagram showing an exemplary view of a cross-section taken along the line A-A in FIG. 7, in accordance with one or more embodiments.
Figure 8B:
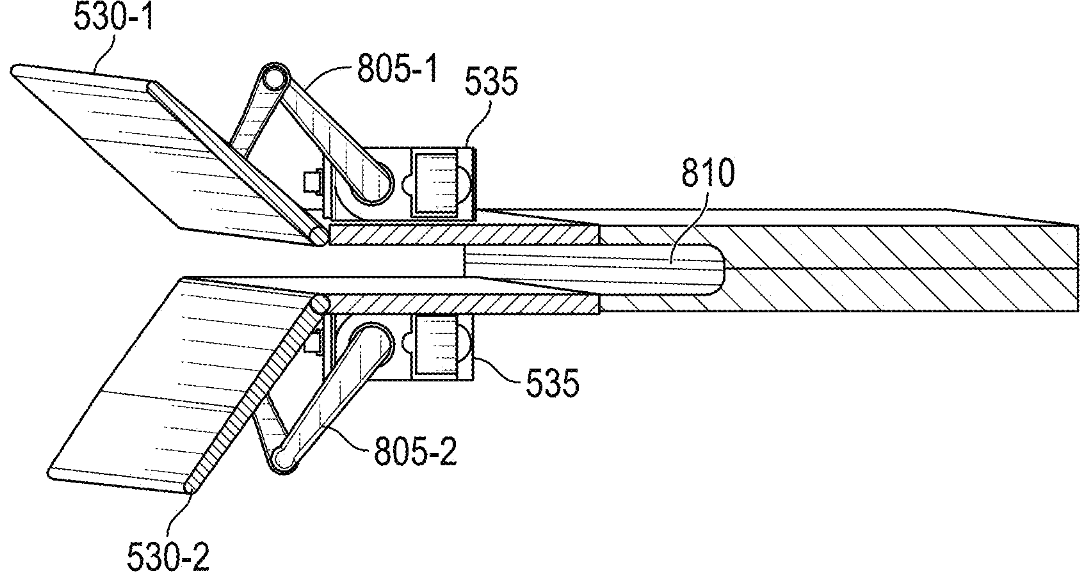
FIG. 8B is a schematic diagram showing another exemplary view of a cross-section taken along the line A-A in FIG. 7, in accordance with one or more embodiments.

FIG. 5 is a schematic diagram showing a side view of an air veil system 500 including an adjustable manifold 530 mounted to a housing 510 containing one or more sensors 520, in accordance with one or more embodiments. The air veil system 500 may be mounted to a vehicle (e.g., vehicle 110 of FIG. 1). Although not shown in FIG. 5, the air veil system 500 may further include a control system. FIG. 6 is a schematic diagram showing a perspective view of the housing 510 on which the adjustable manifold 500 is mounted, in accordance with one or more embodiments. FIG. 7 is a schematic diagram showing a closeup view of the housing 510 of FIG. 6, in accordance with one or more embodiments. FIG. 8A is a schematic diagram showing an exemplary view of a cross-section taken along the line A-A in FIG. 7, in accordance with one or more embodiments. FIG. 8B is a schematic diagram showing another exemplary view of a cross-section taken along the line A-A in FIG. 7, in accordance with one or more embodiments.

As shown in FIGS. 5-8B, the air veil system 500 includes a housing 510 that contains a sensor 520 (e.g., camera), and an adjustable manifold 530 is mounted to the housing 510. In addition to the sensor 520 that requires protection by the air veil system 500, the housing 510 may contain additional sensors or components that may be utilized by the system to, e.g., enable the control system to automatically regulate and inform adjustment of the manifold 530. The control system may thus control to automate adjustments of parameters including operation state (e.g., activate or deactivate the air veil system airflow), the direction, speed, intensity, vortex shape, convergence location(s), and angles of airflow exiting the manifold 530, by accessing the sensor data. Instructions for the automated control may be generated "on-device" by the control system or at a remote location (e.g., central server) and sent to the air veil system 500 over a network (wifi, cellular network, and the like). In one or more embodiments, one of the sensors protected by the air veil 550 may be a sensor whose output is used by the control system to automatically information adjustment of the manifold 530 or the operation state of the air veil system 500. For example, the control system may be configured to turn on the air veil system 500 and generate the protective air veil 500 based on temperature data. That is, the air veil system 500 may be programmed to activate when ambient air temperature, temperature of equipment inside sensor housing 510, etc., as measured by a temperature sensor, becomes higher than a threshold temperature, and the temperature sensor may be one of the sensors 520 that is to be protected by the air veil 550 generated by the air veil system 500.

The manifold 530 includes a pair of surfaces (e.g., 530-1, 530-2; FIGS. 8A-8B), each surface including a plurality of surface sections (e.g., 530A, 530B, . . . , 530F; FIGS. 6-7). An air outlet is defined as a continuous loop by the pair of surfaces in between which the pressurized air received via an air intake 540 can pass and expelled as the airflow 545 that extends outward from the continuous loop of the manifold 530 to create the adjustable, maneuverable air veil 550. Each surface section of each pair of surface sections of the manifold 530 may be coupled to a corresponding actuator 535 to adjust the airflow by changing the position, angle, or orientation of the corresponding surface section of the manifold 530. The actuators 535 may be designed to be waterproof and dustproof to enable continuous, uninhibited operation even if mounted on an outer surface of the air veil system 500, and not within the air veil created by the manifold 530.

By adjusting the actuators 535, the air veil system 500 may change the aerodynamics of the airflow 545 (e.g., change vortices, airflow rate, speed, pressure, direction, intensity), and the resulting characteristics of the air veil 550. That is, as shown in FIG. 5, the air veil 550 may extend outward from the continuous loop of the manifold 530 in front of the housing 510 at an angle such that the air veil converges at a point 560 in an axial direction X of the continuous loop in front of the housing 510. However, for example, by actuating one or more of the actuators 535 on a top side of the housing 510 to position the corresponding surface sections to blow air to the top side of the housing and in front of the housing, and by actuating one or more of the actuators 535 on a bottom side of the housing 510 to position the corresponding surface sections to also blow air to the top side of the housing and in front of the housing, a parallel stream of air pointing to the top can be created. And by actuating all of the actuators 535 to position the corresponding surface sections to blow air inward, the enclosed air veil 550 as shown in FIG. 5 can be created.

For each surface 530-1, 530-2, the independently maneuverable surface sections (e.g., 530A-1, 530B-1, . . . , 530F-1), may be joined together by an elastic material (e.g., semi-flexible, semi-stretchable rubber polymer). Each surface section may be coupled to an actuator 535 so that it can be independently actuated. The elastic material of the surface sections of each surface 530-1, 530-2 may be airtight, thereby preventing high-pressure airflow to inadvertently leak. In addition, the elastic material may be tightly bonded to each of the surface sections (e.g., 530A-1, 530B-1, . . . , 530F-1) of the surface. This enables the surface sections to move independently of one another, allowing each surface section many degrees of freedom to control the airflow 545, and allowing the manifold 530 itself to produce a wide variety of different configurations of the resulting air veil 550, while preventing air leakage or a break in the continuous loop of the air veil. That is, the elasticity of the surface sections enables a continuous stream of the airflow 545 while still retaining maneuverability by operating the actuators 535.

The actuators 535 may be linear actuators and include lever-arm mechanisms (e.g., 805-1, 805-2 in FIGS. 8A-8B) to maneuver the corresponding surface sections. As another example, the actuators 535 may be lever-arm servomotors. As yet another example, the actuators 535 may be linear actuators, directly driven motors, and the like. Each linear actuator 535 moves in and out to push out/pull back the surface section, thereby controlling the angle of the surface section.

While FIGS. 2-4 illustrate one or more embodiments of an air veil system with a static manifold including solid, un-maneuverable surfaces (e.g., 310, 320, 410, 420) or solid, un-maneuverable surface sections (e.g., 230A, 230B in FIG. 2), FIGS. 5-8B illustrate one or more embodiments of an air veil system with an adjustable manifold including maneuverable surface sections that can retain the continuity of airflow 545 expelled from the continuous loop of the manifold 530 in creating the air veil 550, while still enabling dynamic movement of the manifold 530 itself, to create unique forms of airflow 545 while constructing the air veil 550. FIGS. 5-8B further show a high-pressure airflow input port 540 and tube 542 embedded into a side of the manifold 530, centralizing the supply of the airflow to the whole manifold 530.

FIGS. 8A-8B further show openings 810 in the rear of the manifold 530 that are coupled to the air intake 540 and that supply the pressurized air to the corresponding surface section of the manifold 530. FIGS. 8A-8B illustrate an embodiment in which the two surfaces 530-1, 530-2 are connected by hinges to the manifold's 530 structure. Actuators 835 (e.g., servomotors and lever-arm mechanisms) may independently actuate corresponding surface sections to adaptively control the angle of the surface section. Since each surface is independently actuated, the resulting opening of the surfaces may be angled up/down/at various angles, or may be creatively adjusted into different openings, such as a wide opening, as shown in FIG. 8B. Having both surface sections of the pair as independently actuatable also enables the manifold to close entirely by forcing the two surfaces together.

Further, as shown in FIG. 5, the air veil system 500 generates a "three-dimensional" air veil 550 (e.g., cone-shaped volume) that allows the sensor 520 to be placed anywhere within the volume, including in front of the plane of the manifold 530, thereby resulting in an increased and unobstructed field of view for the sensor. Since the air veil 550 may extend outward from the continuous loop of the manifold 530 in front of the housing 510 at an angle such that the air veil converges at a point 560 in an axial direction X of the continuous loop in front of the housing 510, the sensor 520 can be placed anywhere within the volume defined by the air veil 550. That is, as shown in FIG. 5, a distal portion of an exterior surface 565 of the sensor 520 is farther in the axial direction X from the housing 510 than a distal portion of an exterior surface 570 of the manifold 530. Since the design allows the sensor 520 to be in front of the high-pressure airflow source (i.e., the manifold 530), the field of view of the sensor is not impeded by the structure of the manifold 530, thereby ensuring full functionality of the sensor 520. That is, since the fully enclosed volume of air created by the continuous air veil 550 is a volume (as opposed to a "two-dimensional curtain of air" of conventional systems), anything within the volume, such as the sensor 520 offset in front of the manifold 530, is protected by the air veil 550.

Figure 9:
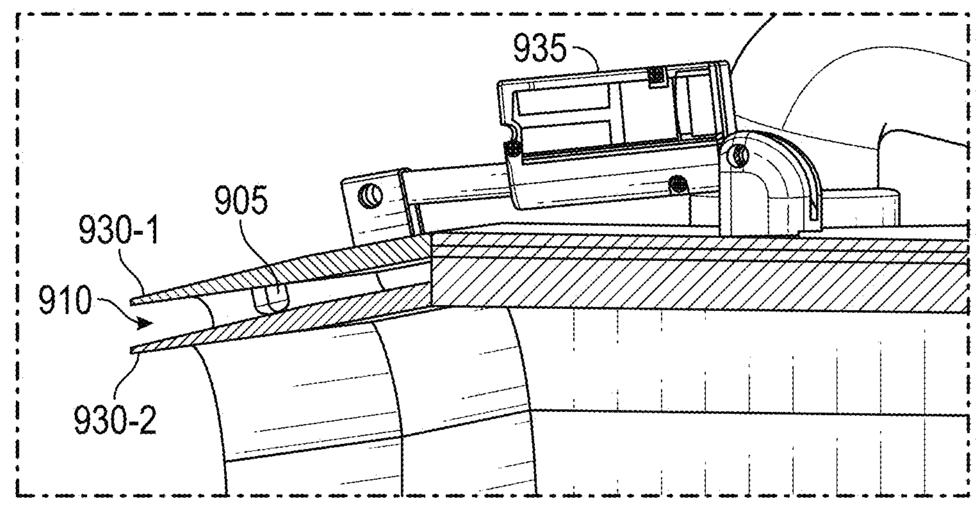
FIG. 9 is a schematic diagram showing an exemplary view of a cross-section of an air veil system including one actuator per pair of surface sections, in accordance with one or more embodiments.

FIGS. 5-8B illustrate one or more embodiments of an air veil system with an adjustable manifold including maneuverable surface sections that are doubly actuatable. That is, as shown in FIGS. 8A-8B, each surface (or each surface section 830-1, 830-2) of the pair of surfaces has a corresponding actuator 835 to actuate the surface. Instead of two actuators 835 per surface subsection as shown in FIGS. 8A-8B, one or more embodiments of the air veil system might include a single actuator per surface subsection. FIG. 9 is a schematic diagram showing an exemplary view of a cross-section of an air veil system including one actuator per pair of surface subsection.

In FIG. 9, the two surfaces (or two surface sections) 930-1, 930-2 are paired together with a "four-bar linkage" type mechanism and controlled with a single linear actuator 935 mounted to an outer surface of the manifold or housing. That is, in the embodiment of FIG. 9, each surface subsection is independently controlled by one linear actuator 935. Such a design reduces mechanical complexity, while still retaining independent control of each individual pairs of surface sections. As shown in FIG. 9, a flexible connector piece 905 may be disposed in between the two surfaces 930-1, 930-2. The connector piece 905 may serve as a joint to enable the pair of surfaces (or pair of surface sections) 930-1, 930-2 to work as a "four-bar linkage" mechanism, keeping the two surface sections 930-1, 930-2 parallel to each other at all times despite the actuation by the linear actuator 935. The connector piece 905 may be positioned behind an opening 910 of the manifold at the distal edge of the surface sections 930-1, 930-2, and may have a diamond-like shape to redirect airflow such that the high-pressure is momentarily split by the back end of the connector piece 905, but then rejoined at the front end. This ensures that even though the connector piece 905 connects the two surfaces 930-1, 930-2 together the resulting pressurized air, as it flows out through the opening 910 of the manifold, is once-again continuous and without any breakages. As a result, the design ensures that the air veil created by the manifold of FIG. 9 remains continuous and without any gaps from where environmental contaminants can enter. Since the air veil of pressurized air is powerful enough to protect the sensor(s) disposed in the housing from environmental contaminants, it becomes unnecessary to include any additional physical shielding to cover the sensor (e.g., glass plate to cover a camera lens) in the housing, thereby increasing mechanical simplicity.

Figure 10:
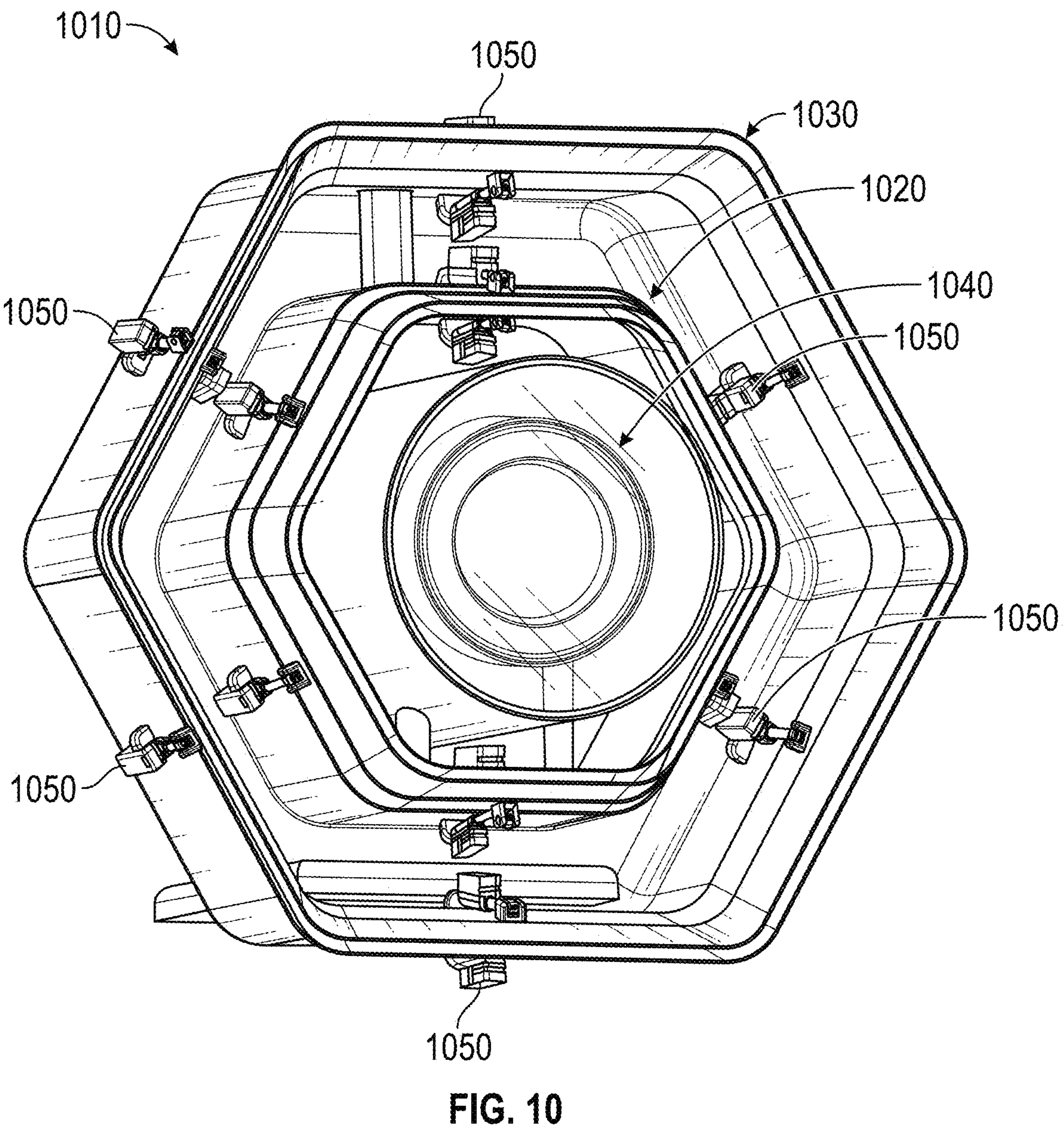
FIG. 10 is a schematic diagram showing a perspective view of a housing mounted with a first manifold and a second manifold, in accordance with one or more embodiments.
Figure 11:
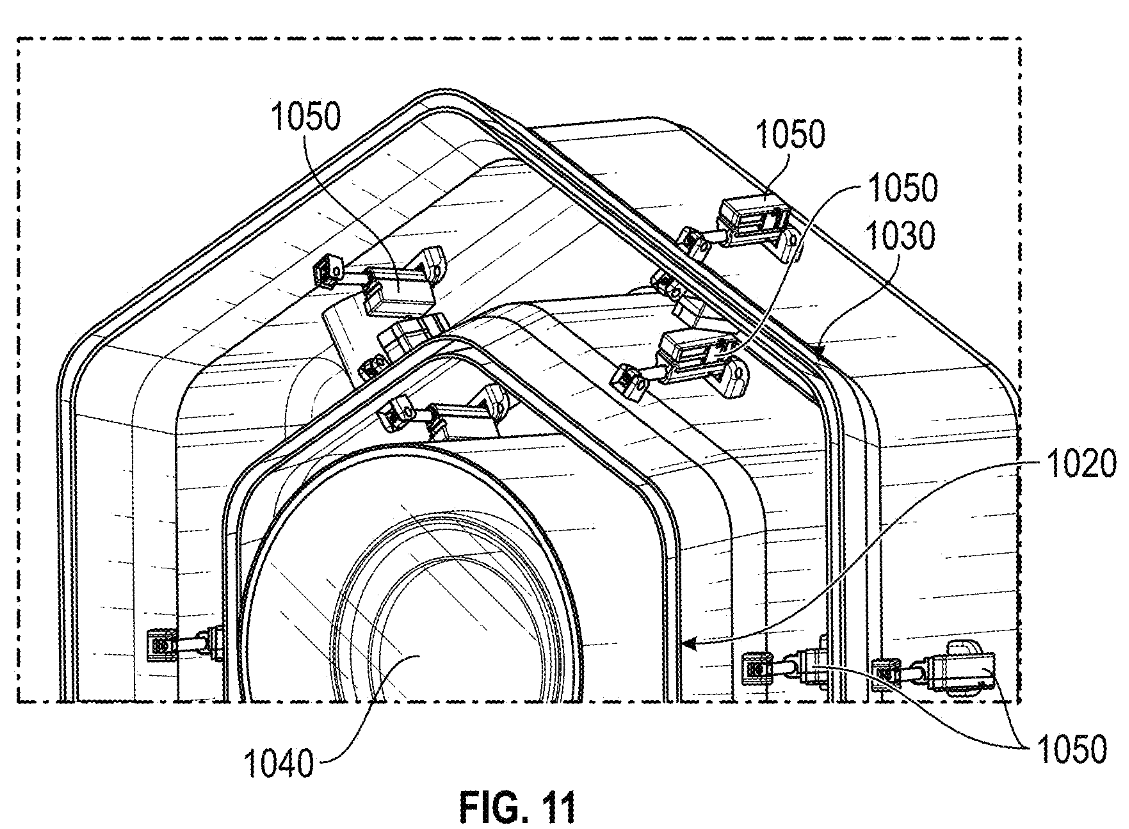
FIG. 11 is a schematic diagram showing a closeup view of the housing of FIG. 10, in accordance with one or more embodiments.

FIGS. 10-11 show how multiple manifolds may be layered concentrically to provide multiple, independently varying streams of air to create air veils, and how these manifolds may be connected to receive high-pressure air from a singular source. More specifically, FIG. 10 is a schematic diagram showing a perspective view of a housing 1010 mounted with a first manifold 1020 and a second manifold 1030, in accordance with one or more embodiments. FIG. 11 is a schematic diagram showing a closeup view of the housing 1010 of FIG. 10, in accordance with one or more embodiments.

As shown in FIGS. 10-11, the first and second manifolds 1020, 1030 are concentric with one another, both encircling the same sensor 1040, with the second manifold's 1030 continuous loop extending along an outer periphery of the continuous loop of the first manifold 1020. FIGS. 10-11 further show that each of the first and second manifolds 1020, 1030 include surface subsections which are doubly actuatable by operating the corresponding actuators 1050. Having two manifolds 1020, 1030 allows the air veil system to have added versatility in the airflows and the air veils that it creates. When these manifolds are layered, if both manifolds direct airflow inwards into a conical-like enclosure of the air veil, they will create two enclosures of air, one inside the other. This allows for increased protection of the sensor 1040 from contaminants in environments where there may be a high density of possible contaminants that could assail the sensor at any given time from any given direction at high velocity. Having two layers of protection allows for a more robust performance of the system's air veil protection capability in these harsher environments.

In addition, the outer manifold 1030 may be directed outwards to create a widespread or diverging angle of airflow. This may be useful in situations where the system is going through an environment full of lingering fog/mist/spray in the air, and the air to the sides of the air veil system must be cleared of residual mist for the sensor 1040 to function properly. In this case, if the sensor 1040 is a camera with a constant, angular field of view, the manifold 1030 could dilate and expand to an identical angle as the camera sensor's 1040 field of view, thereby actively preventing most of the mist from entering this expanding conical-like volume directly in front of the system, even if the system is moving rapidly through this mist-filled environment. At the same time, the inner manifold 1020 may continue directing airflow inwards to provide the full, continuous, unbroken seal of air veil protection for the sensor 1040. Both manifolds 1020, 1030 may be connected to the same source of air, reducing mechanical complexity. In the embodiment shown in FIGS. 10-11, the camera sensor 1040 also has an additional physical layer of glass shielding in front of it (also inside of the air veil volume). This may be useful in environments where the air veil prevents contaminants in the environment from reaching the physical glass, but the physical glass protects the sensor from any solid, physical intrusions (like a stray branch in an orchard environment).

Figure 12:
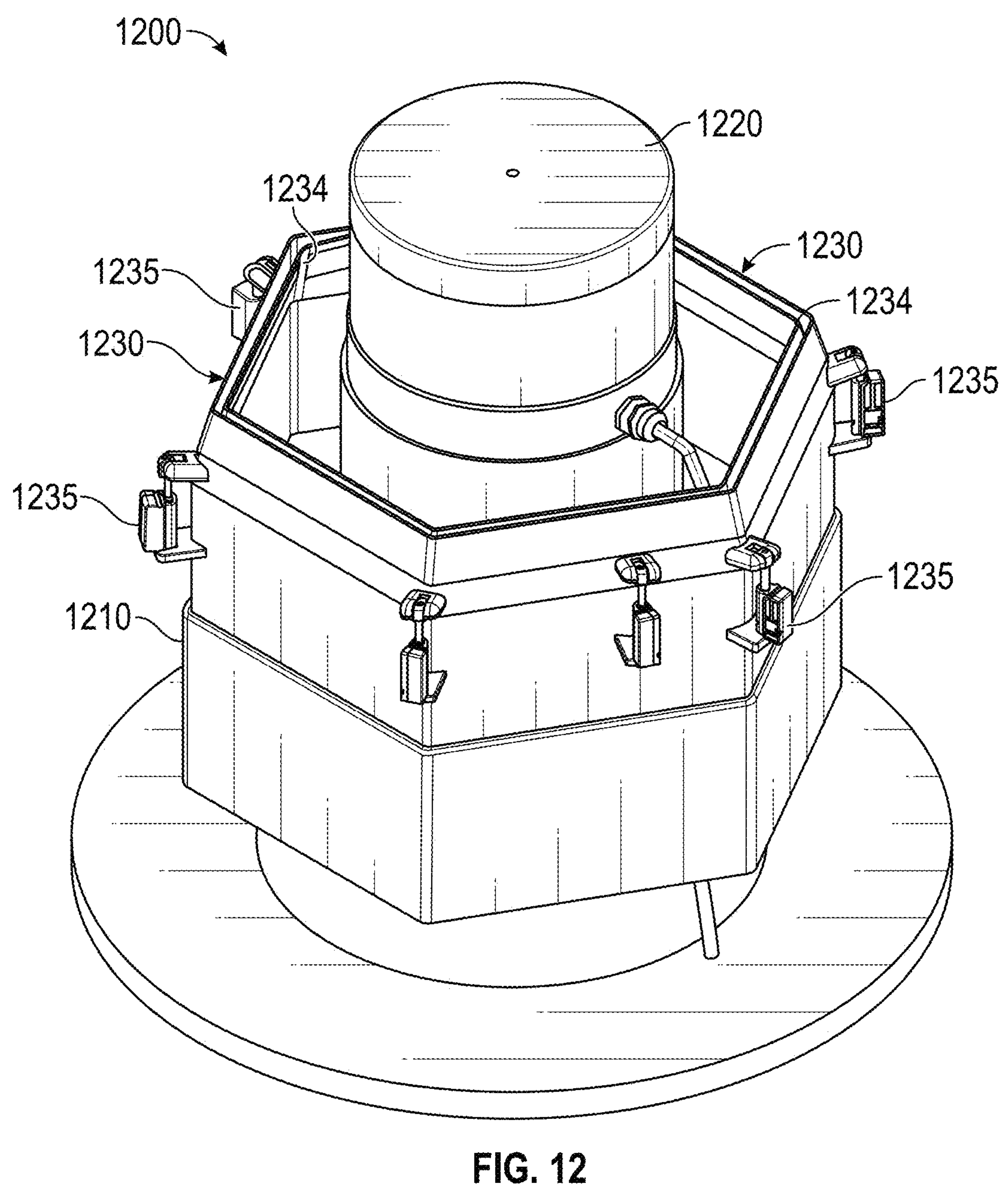
FIG. 12 is a schematic diagram showing a perspective view of an air veil system including a housing containing a LIDAR sensor, in accordance with one or more embodiments.

FIG. 12 is a schematic diagram showing a perspective view of an air veil system 1200 including a housing 1210 containing a LIDAR sensor 1220 and a manifold 1230 mounted to the housing 1210, in accordance with one or more embodiments. FIG. 12 illustrates the ability of the air veil system according to the present disclosure to be applicable to different sensors, including sensors like the LIDAR sensor 1220 of FIG. 12 that require a wide field of view and require the manifold 1230 to be offset behind the plane of the sensor 1220, thereby allowing uninterrupted sensing but still containing the sensor 1220 within the air veil's enclosed volume of high-pressure air. More specifically, since the LIDAR sensor 1220 requires unimpeded field of view to its sides at a full 360-degree angle, and since the air veil system 1200 allows the sensor 1220 to be offset in front of the manifold 1230 (i.e., distal end of sensor 1220 in front of the housing 1210 is farther in an axial direction of the housing than distal end of the manifold 1230), the sensor can function normally without consideration as to how the air veil system 1200 may affect sensor readings.

Further, the manifold 1230 surfaces (or surface sections) may be made of an elastic, stretchable, rubber-like material, and the corresponding actuators 1235 may include rod-like members that, when actuated, flex the surface (or surface sections) itself to contort/contract/dilate the surface (or surface sections) and thereby change the position, orientation, or angle of the surface (or surface sections). For example, each manifold 1230 surface of the pair of surfaces may be a continuous elastic band stretched around solid rods 1234, that can be maneuvered by respective actuators 1235, which create the surface sections. The actuators 1235 may be attached to the solid rods 1234 around which the elastic bands are stretched to form the surfaces of the manifold 1230.

In FIG. 12, some of the solid rods 1234 that define the inner surface of the manifold 1230 are visible, but the outer surface's rods are not visible since they may be embedded within the elastic material itself. For both surfaces, the elastic band is stretched around the rods 1234 to form the surface structure itself. Since the outer surface's rods are embedded within the elastic material itself, it frees up space in between the two surfaces, such that the only structure that spans between the two surfaces is a conjoining connector (like connector 905 in FIG. 9) that enables the four-bar linkage mechanism. As explained in connection with FIG. 9, this connector may be inset from the edge of the surfaces, allowing airflow to flow past the connector and re-join before exiting the manifold, ensuring the resulting air veil stays as one continuous, fully enveloping volume of air. The elastic bands defining the two surfaces of the manifold 1230 may be bound in an airtight manner to the rest of the air veil system 1200, such that no air can escape unless it is through the opening (i.e., continuous loop air outlet) of the manifold 1230.

Figure 13:
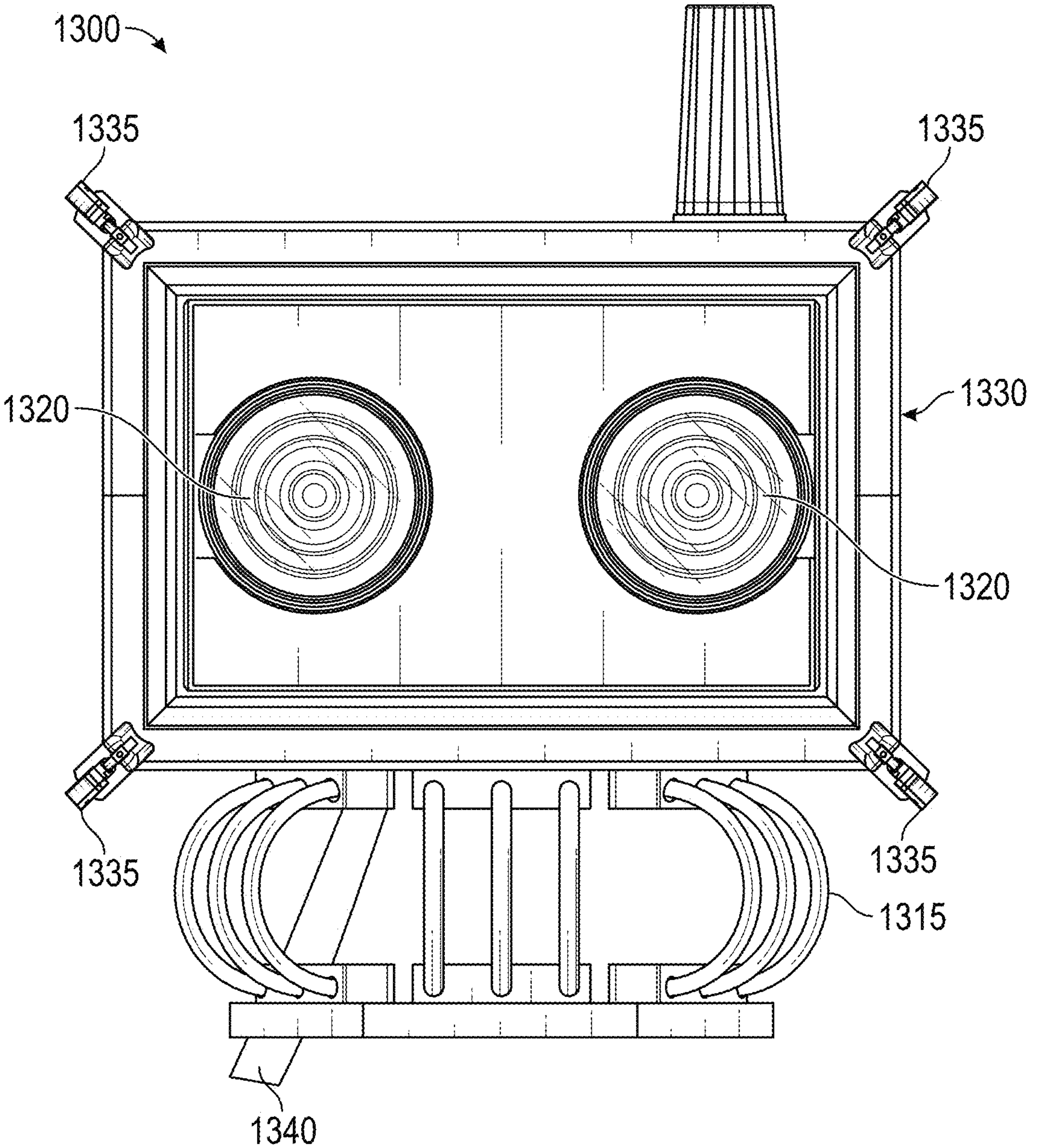
FIG. 13 is a schematic diagram showing a front view of an air veil system including a housing containing a stereo camera sensor, in accordance with one or more embodiments.

FIG. 13 is a schematic diagram showing a front view of an air veil system 1300 including a housing 1310 containing a stereo camera sensor 1320 and a manifold 1330 mounted to the housing 1310, in accordance with one or more embodiments. As shown in FIG. 13, a stereo camera sensor 1320 may be housed in a rectangular housing 1310 with a manifold 1330 (e.g., elastic band surfaces) with four actuators 1335. Although not shown in FIG. 13, the housing 1310 may further contain a control system to inform actuation of the actuators 1335 based on sensor data and thereby control the shape and other characteristics of the resulting air veil. The housing 1310 may be suspended on a wire-based shock absorber 1315 to absorb any vibrations or impacts from the vehicle (not shown) the air veil system 1300 may be mounted to.

The housing may include additional sensors (e.g., Real-time Kinetic Global Positioning Sensor (RTK GPS), an Inertial Measurement Unit (IMU), wind direction sensor, wind speed sensor) to feed precise location information to the control system. The control system may access the sensor data to measure properties like vehicle operation state (e.g., whether vehicle is currently in operation, whether vehicle is currently performing the spraying operation, spraying operation parameters, vehicle operation speed), vehicle velocity and resultant wind-flow and direction to adapt the air veil shape to best suit the current exterior conditions and exterior aerodynamics of the environmental air as it passes by the system 1300. In addition to or instead of, affecting the aerodynamics of the air veil, control system may also perform operations like turning the air veil system on or off based on the sensor data. For example, the control system may automatically activate the air veil system when the sensor data indicates that the vehicle is actively performing the spraying operation. As another example, the control system may automatically adjust one or more parameters (e.g., size, shape, volume, direction, airflow rate) of the generated air veil based on the type of chemical being sprayed in the spraying operation, spraying intensity of the spraying operation, the vehicle speed, wind speed, environmental conditions, and the like. As another example, the control system may automatically activate the air veil system based on the sensor data indicating that the speed of the vehicle on which the air veil system is mounted is higher than a threshold.

As shown in FIG. 13, the housing further includes a port 1340 for supplying the input of high-pressure air in the rear of the housing, which enables the housing to route the airflow past the internal components (e.g., stereo camera sensor 1320, other sensors, control system), thereby cooling the components with the input high-pressure airflow. That is, in one or more embodiments, the airflow from air intake 1340 may be routed through the interior of the housing, and around the sensor 1320 and other components housing in the housing 1340 first, before flowing out through the manifold 1330 to create the air veil. This demonstrates the capability to utilize the high-pressure airflow to double as a way to regulate the internal temperature of the air veil system 1300.

In one or more embodiments, the pressurized air pushed through the manifold may be transparent air (e.g., ambient air) or may be of any other color. The air may be one or more of various gaseous materials, including but not limited to oxygen, nitrogen, or the gas surrounding the housing in the ambient air.

In one or more embodiments, if the air is drawn from the ambient environment, the air may be filtered to prevent contaminants from being present in the air stream. For example, the air veil system may include one or more filters to filter the air before and/or after it is pressurized, and at one or more points before it reaches the one or more manifold for being expelled to create the air veil. Filtering the air before it is expelled as the air veil may ensure that the air is free of stray particulates and is fully transparent. This enables the sensor(s) being protected by the air veil system to be unaffected by the air veil created by the flow of continuous high-pressure air.

In one or more embodiments, a temperature of the airflow may be regulated to control, e.g., the humidity of the air surrounding the sensor, the temperature of one or more components housed in the housing, and the like. The temperature of the airflow expelled from the manifold may be maintained in a predetermined temperature range. The air veil system may include a heater and/or a cooler to heat or cool the air and maintain the pressurized air to be within the temperature range.

The pressurized air may be received by the air veil system from an air source. For example, the air source may include a compressor, air tank, a source of pre-compressed air, a fan generating high-pressure air current, and the like. For example, a fan of the air source may draw in ambient air, filter the air, and cause it to be compressed and input into an air inlet of the air veil system at a predetermined pressure. A pressure regulator may be disposed on the air flow path between the air source and the air inlet for the air veil system to regulate the air pressure/flow of air into the manifolds. The regulator may be connected to and operated by the control system. The air veil system and the air source may be powered by one or more sources of power including the vehicle on which the air veil system is mounted, a battery pack, solar power, and the like.

The air veil system and protected sensors and associated housing may or may not be mounted on a vehicle or other mobile platform. The system can function regardless of if it is stationary or mobile. For example, the air veil system may be mounted to an existing vehicle-integrated sensor system such as a radar embedded in a vehicle for pre-existing autonomy functions. As another example, the air veil system may be mounted to a stationary in-field crop camera sensor that monitors the growth of a specific plant(s).

The manifold's surfaces (or surface sections) may independently tilt/rotate as well as dilate/contract, and the like, to influence the shape of the resulting air veil, as well as affect the creation of various air vortices/aerodynamic effects of the high-pressure air being discharged from the manifold, especially when the surfaces (or surface sections) are not oriented in a parallel manner, thereby creating air vortices that further dispel lingering particulates in the surrounding air. The surfaces (or surface sections) of the manifold may be constructed of rigid materials for static manifolds or have flexibility (e.g., using elastics, semi-flexible plastics, semi-rigid rubbers, and the like) for adjustable manifolds. Adjustable manifolds having surface sections may be composed of multiple pieces of different materials, e.g., rigid plates/materials blended with semi-rigid/elastic materials to result in a continuous form that stretches around the protected sensor and in which the continuity is preserved even with the tilt/rotation and contraction/dilation of the manifold itself.

The pressurized air can then be manipulated using the actuators of the air veil system to be expelled from the manifold with desired aerodynamics to create the air veil. The high-pressure airflow supplied to the housing may also be used in conjunction with various vents or small openings in the housing to create a higher-pressure environment inside the housing to serve as a "positive pressure chamber" to prevent additional influx of contaminants that may leak through the housing and towards the sensor in case the housing or sensor body itself is not completely sealed against exterior contaminants.

Figure 14:
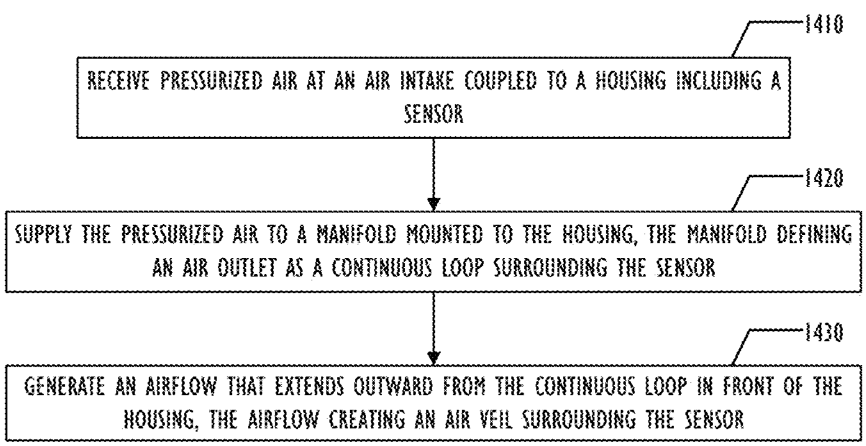
FIG. 14 is a flow chart of an embodiment of a method for creating an air veil, in accordance with one or more embodiments.

FIG. 14 is a flow chart of an embodiment of a method for creating an air veil, in accordance with one or more embodiments. Method 1400 may start at block 1410 by an air veil system (e.g., FIGS. 2, 5) receiving pressurized air at an air intake (e.g., 240, 540) coupled to a housing (e.g., 210, 510) including a sensor (e.g., 220, 520). Method 1400 may then move to block 1420 where the air veil system may supply the pressurized air to a manifold mounted to the housing, the manifold defining an air outlet as a continuous loop surrounding the sensor. As shown in, e.g., FIGS. 2-6, the air outlet may be formed as a continuous loop that surrounds the sensor that is being protected by the system from environmental contaminants. Method 1400 may then move to block 1430 where the air veil system may generate an airflow that extends outward from the continuous loop in front of the housing, the airflow creating an air veil surrounding the sensor. As shown in, e.g., FIGS. 2 and 5, air veil 250, 550 may be created by the airflow 245, 545 being expelled from the continuous loop of the manifold.

Figure 15:
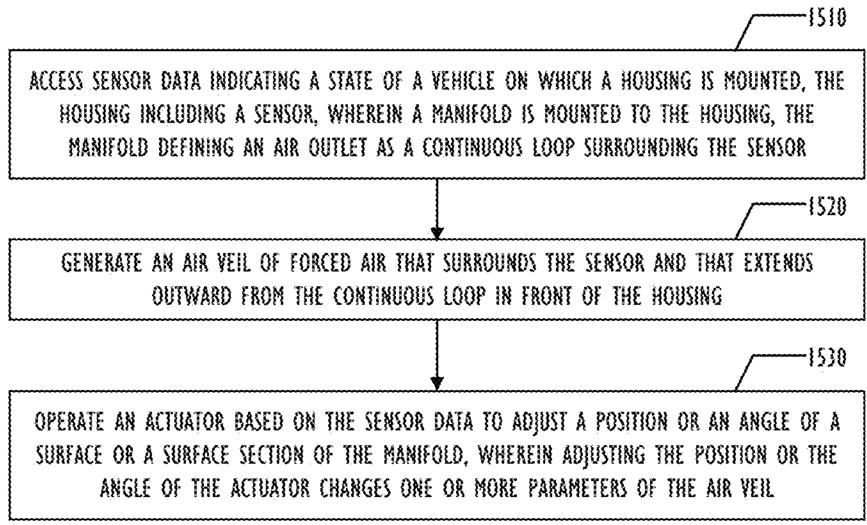
FIG. 15 is a flow chart of an embodiment of a method for adjusting an air veil, in accordance with one or more embodiments.

FIG. 15 is a flow chart of an embodiment of a method for adjusting an air veil, in accordance with one or more embodiments. Method 1500 may start at block 1510 by a control system accessing sensor data indicating a state of a vehicle on which a housing is mounted, the housing including a sensor, wherein a manifold is mounted to the housing, the manifold defining an air outlet as a continuous loop surrounding the sensor. Method 1500 may then move to block 1520 where the control system may cause the manifold to generate an air veil of forced air that surrounds the sensor and that extends outward from the continuous loop in front of the housing. Method 1500 may then move to block 1530 where the control system may operate an actuator based on the sensor data to adjust a position or an angle of a surface or a surface section of the manifold, wherein adjusting the position or the angle of the actuator changes one or more parameters of the air veil.

OTHER CONSIDERATIONS

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An air veil system comprising:

a housing including a sensor;

a manifold mounted to the housing, the manifold defining an air outlet as a continuous loop surrounding the sensor, wherein the air outlet is configured to receive a supply of pressurized air from an air source and generate an airflow that extends outward from the continuous loop in front of the housing, the airflow creating an air veil surrounding the sensor, and wherein the manifold includes a first surface and a second surface disposed at a predetermined gap relative the first surface, the air outlet as the continuous loop being defined by the predetermined gap; and an actuator that actuates at least one of the first surface and the second surface to adjust a position or an angle of the at least one of the first surface and the second surface, wherein the at least one of the first surface and the second surface includes a plurality of surface sections, and wherein the actuator includes a plurality of actuators to independently actuate the plurality of surface sections.

2. The air veil system of claim 1, wherein the air veil extends outward from the continuous loop in front of the housing at an angle such that the air veil converges at a point in an axial direction of the manifold in front of the housing.

3. The air veil system of claim 2, wherein a distal portion of an exterior surface of the sensor is farther from the housing in the axial direction than a distal portion of an exterior surface of the manifold.

4. The air veil system of claim 1, wherein the actuator adjusts the air veil surrounding the sensor by actuating the at least one of the first surface and the second surface.

5. The air veil system of claim 4, wherein the actuator adjusts at least one of a shape of the air veil, an air volume defined by the air veil, a convergence angle of the air veil, a flow rate of the airflow, a direction of the airflow, and a pressure rate of the airflow.

6. The air veil system of claim 1, further comprising a control system that is configured to receive sensor data and activate or deactivate the airflow generated by the air veil system based on the sensor data.

7. The air veil system of claim 6, wherein the sensor data received by the control system includes data associated with one or more of wind speed, wind direction, airflow rate, vehicle direction, vehicle speed, vehicle operation state, temperature, and humidity, and wherein the control system is further configured to control the actuator to adjust the position or the angle of the at least one of the first surface and the second surface based on the received sensor data.

8. The air veil system of claim 1, wherein the manifold is a first manifold and wherein the air veil system further includes a second manifold defining a second air outlet as a second continuous loop, wherein the second continuous loop extends along an outer periphery of the continuous loop of the first manifold.

9. The air veil system of claim 8, wherein the second manifold is configured to generate a second airflow that extends outward from the second continuous loop in front of the housing.

10. The air veil system of claim 9, wherein the second airflow extends outward from the second continuous loop in front of the housing in a diverging direction, and the airflow from the first manifold extends outward in front of the housing in a converging direction.

11. The air veil system of claim 8, wherein the first manifold and the second manifold are concentric.

12. A method for creating an air veil, comprising:

receiving pressurized air at an air intake coupled to a housing including a sensor;

supplying the pressurized air to a manifold mounted to the housing, the manifold defining an air outlet as a continuous loop surrounding the sensor, wherein the manifold includes a first surface and a second surface disposed at a predetermined gap relative the first surface, the air outlet as the continuous loop being defined by the predetermined gap;

generating an airflow that extends outward from the continuous loop in front of the housing, the airflow creating an air veil surrounding the sensor; and actuating an actuator to adjust a position or an angle of at least one of the first surface and the second surface, wherein the at least one of the first surface and the second surface includes a plurality of surface sections, and wherein the actuator includes a plurality of actuators to independently actuate the plurality of surface sections.

13. The method of claim 12, wherein the air veil extends outward from the continuous loop in front of the housing at an angle such that the air veil converges at a point in an axial direction of the manifold in front of the housing.

14. The method of claim 13, wherein a distal portion of an exterior surface of the sensor is farther from the housing in the axial direction than a distal portion of an exterior surface of the manifold.

15. A method for adjusting an air veil, comprising:

accessing sensor data indicating a state of a vehicle on which a housing is mounted, the housing including a sensor, wherein a manifold is mounted to the housing, the manifold defining an air outlet as a continuous loop surrounding the sensor, and wherein the manifold includes a first surface and a second surface disposed at a predetermined gap relative the first surface, the air outlet as the continuous loop being defined by the predetermined gap;

generating an air veil of forced air that surrounds the sensor and that extends outward from the continuous loop in front of the housing; and operating an actuator based on the sensor data to adjust a position or an angle of at least one of the first surface and the second surface, wherein the at least one of the first surface and the second surface includes a plurality of surface sections, and wherein the actuator includes a plurality of actuators to independently actuate the plurality of surface sections such that adjusting the position or the angle changes one or more parameters of the air veil.

16. The method of claim 15, wherein the one or more parameters include a shape of the air veil, an air volume defined by the air veil, a point of convergence or a convergence angle of the air veil, an airflow rate, a flow direction of the air veil, and a pressure rate.

* * * * *